United States Patent [19]
Vaughn

[11] Patent Number: 6,044,962
[45] Date of Patent: Apr. 4, 2000

[54] LEHR LOADER PUSHER BAR ASSEMBLY

[75] Inventor: James H. Vaughn, Anderson, Ind.

[73] Assignee: Owens-Brockway Glass Container Inc., Toledo, Ohio

[21] Appl. No.: 09/107,155

[22] Filed: Jun. 29, 1998

[51] Int. Cl.[7] .................................................. B65G 37/00
[52] U.S. Cl. ........................................... 198/598; 198/597
[58] Field of Search ..................................... 198/598, 597, 198/431, 426, 429, 430, 736

[56] References Cited

U.S. PATENT DOCUMENTS

| | | | |
|---|---|---|---|
| 1,726,657 | 9/1929 | Ekwall | 198/597 |
| 1,727,299 | 9/1929 | Molins | 198/597 |
| 1,827,738 | 10/1931 | Cramer | 198/431 |
| 3,184,031 | 5/1965 | Dumlap . | |
| 3,993,183 | 11/1976 | Stengle, Jr. | 198/429 |
| 4,003,464 | 1/1977 | Zappia | 198/430 |
| 4,067,434 | 1/1978 | Mumford . | |
| 4,595,091 | 6/1986 | Scopatz et al. | 198/372 |
| 4,923,363 | 5/1990 | Difrank | 414/752 |
| 5,044,488 | 9/1991 | Bolin . | |
| 5,755,847 | 5/1998 | Quayle | 65/260 |

*Primary Examiner*—Christopher P. Ellis
*Assistant Examiner*—Khoi H. Tran

[57] ABSTRACT

A pusher bar assembly (20) having a flexible, horizontally extending pocket bar (22) of sufficient longitudinal extent to push a linear array of glass containers on a cross-conveyer transversely of the cross-conveyor into an annealing lehr. The pocket bar, which engages the containers to be pushed, is disengageably secured to a pair of aligned horizontal pusher bars (26, 28), whose adjacent ends are spaced apart from one another. The pusher bars are secured, respectively, to first and second downwardly extending beams (30, 32).

7 Claims, 9 Drawing Sheets

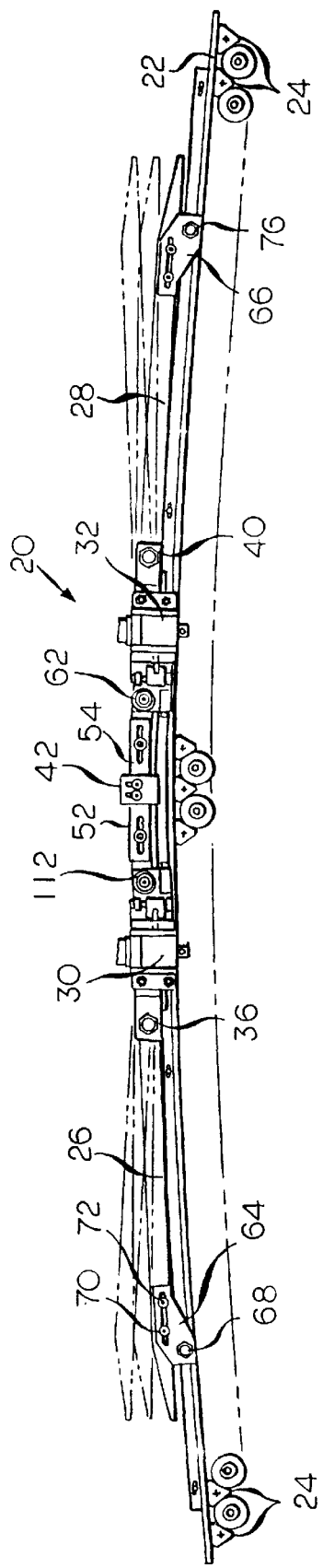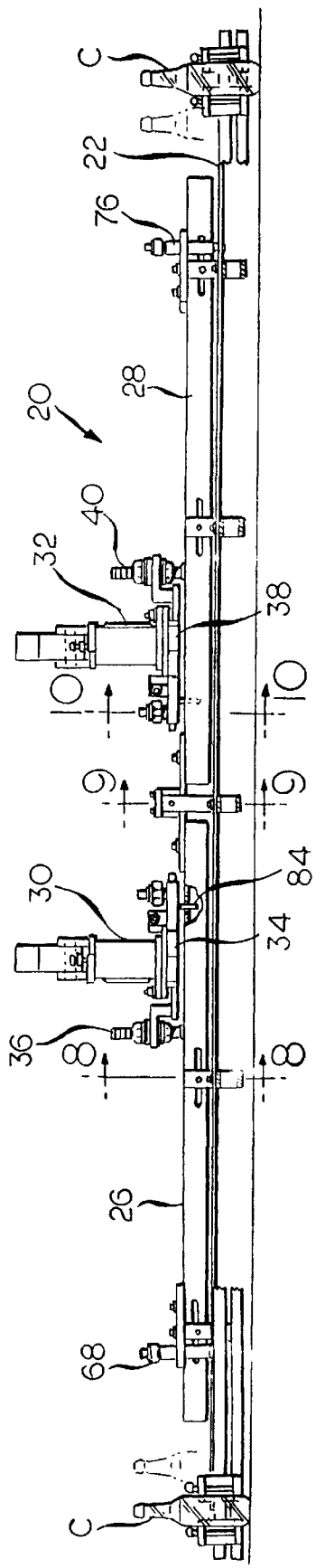

LEHR LOADER PUSHER BAR ASSEMBLY

FIELD OF THE INVENTION

This invention relates to a pusher bar assembly for an article transfer device of a type used in transferring articles disposed in a linear array on a conveyor transversely of the conveyor into an article processing unit. More particularly, this invention relates to a pusher bar assembly for an article transfer device of the forgoing character for transferring freshly formed glass containers to the upper horizontal surface of a moving conveyer of an annealing lehr, namely, a type of transfer device that is often called a lehr loader or a stacker.

BACKGROUND OF THE INVENTION

U.S. Pat. No. 5,044,488 (Bolin) discloses a lehr loader or stacker having a vertical series of movable carriages, the lowermost of which is supported by a support structure at an elevation above the floor of the plant in which the lehr loader is installed. The lowermost carriage is moveable toward an adjacent annealing lehr to advance a linear series of glass containers on a conveyor, described in the reference as a cross-conveyer, positioned between the stacker and the lehr, transversely of the cross-conveyer into the lehr. An intermediate carriage is mounted on the lowermost carriage and is moveable with the lowermost carriage and is independently moveable with respect to the lowermost carriage in a direction parallel to the direction of movement of the cross-conveyer to keep new containers on the cross-conveyer from piling up against a pocket bar, which is carried by a pusher bar that is carried by the uppermost carriage, during the motion of the lowermost carriage toward the lehr. The third, uppermost carriage is mounted above the intermediate carriage and is moveable with the lowermost carriage and the intermediate carriage and is moveable in a vertical direction independently of the intermediate carriage and the lowermost carriage to elevate the pusher bar above the tops of the incoming containers on the cross-conveyor during the return of the pusher bar to a start position. Other lehr loaders are disclosed in U.S. Pat. No. 4,067,434 (Mumford) and U.S. Pat. No. 3,181,031 (Dunlap), which were assigned to a predecessor of the assignee of this application, the disclosure of each of which is incorporated by reference herein. An improved lehr loader of the forgoing general description is also disclosed in pending U.S. patent application Ser. No. 08/931,720, which is assigned to the assignee of this application.

Modern glass container annealing lehrs are quite wide, to be able to suitably process the output of modern, high productivity glass container forming machines. The width of the conveyer belt that carries glass containers through the lehr determines the overall required width of the pusher bar assembly of the lehr loader associated with such lehr, and a full width pocket bar for such a pusher bar assembly, of the type taught by the prior art, is subject to warpage along its length, especially in the high temperature environment in which lehr loaders are used, which often reaches, or even excedes 400° F. This pusher bar warpage problem is especially severe in the case of lehr loaders designed to provide containers to annealing lehrs that have an especially large internal width.

BRIEF DESCRIPTION OF THE INVENTION

According to the present invention, there is provided a pocket bar-carrying pusher bar assembly for a glass container annealing lehr whose pocket bar is substantially more resistant to end to end warpage than the pocket bars of prior art pusher bar assemblies. The pocket bar of the present invention is attached to a pusher bar that constructed in at least two segments, which are disposed end to end, each such segment being substantially less subject to end to end warpage than a single piece pusher bar. Further, the pusher bar assembly of the present invention carries a plurality of threaded adjustments for horizontally and vertically adjusting the positions of the pocket bar that is carried by the multiple piece pusher bar for straightening the pocket bar relative to the pusher bar without the need for spacers and washers as taught by the prior art for ensuring a suitably straight and properly positioned pocket bar.

Accordingly, it is an object of the present invention to provide an improved pusher bar assembly for an article transfer device of the type used in transferring articles disposed in a linear array transversely of the linear array. More particularly, it is an object of the present invention to provide an improved pusher bar assembly of the forgoing character that has utility as a pusher bar assembly for a lehr loader of the type used in transferring freshly formed glass containers from a container cross-conveyor to a moving conveyor of an annealing lehr. It is also an object of the present invention to provide an improved pusher bar assembly for a glass container annealing that is less subject to end to end warpage than prior art lehr loader pusher bar assemblies For a further understanding of the present invention and the objects thereof, attention is directed to the drawing and to the following brief description thereof, to the detailed description of the preferred embodiment and to the appended claims.

BRIEF DESCRIPTION OF THE DRAWING

FIG. 1 is a front elevational view of the pusher bar assembly according to the preferred embodiment of the present invention;

FIG. 2 is a plan view of the pusher bar assembly of FIG. 1;

DETAILED DESCRIPTION OF THE PREFERRED EMBODIMENT

Figure 3:
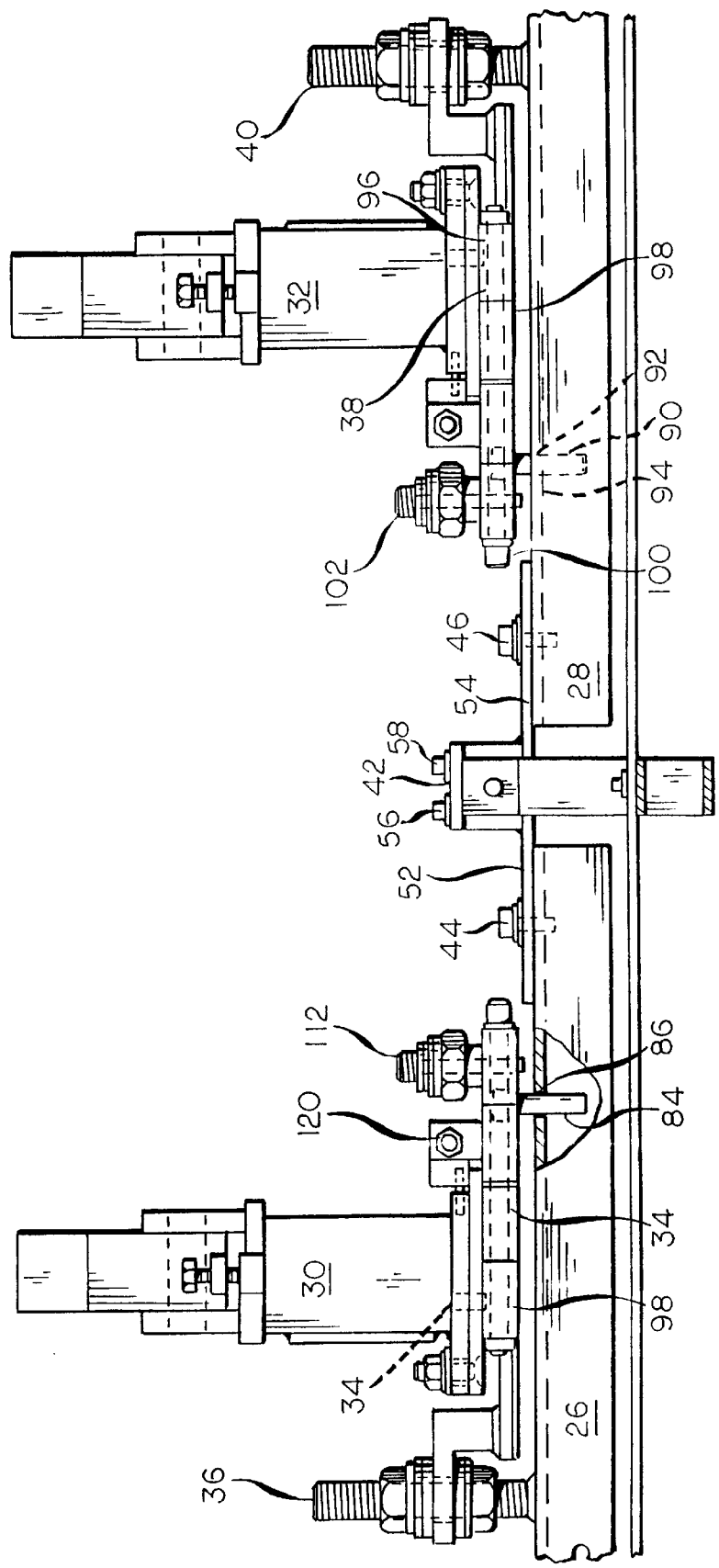
FIG. 3 is a fragmentary front elevation view, at an enlarged scale, of a pusher bar assembly according to FIGS. 1 and 2.

A pusher bar assembly according to the preferred embodiment of the present invention is generally indicated by the reference numeral 20 in FIGS. 1 and 2. The pusher bar assembly 20 includes a generally horizontally extending single piece pocket bar 22 that extends the full width of the inside width of a glass container annealing lehr (not shown). The pocket bar 22 is provided with a spaced apart plurality of generally triangularly shaped teeth 24 that define pockets for engaging freshly formed glass containers C to be annealed.

The pocket bar 22 is supported on a plurality of generally horizontally extending pusher bars disposed end to end, shown as pusher bars 26, 28. The pusher bars 26, 28 are secured to downwardly extending beams 30, 32, respectively, which are part of the uppermost carriage, otherwise not shown, of a three-axis lehr loader of a type known in the prior art. The pusher bar 26 is suspended from a generally horizontally extending flange 34 that is secured to the bottom of the beam 30 by a threaded fastener 36, which permits the elevation of the pusher bar 26 to be adjusted relative to the beam 30. Likewise, the pusher bar 28 is supported from a generally horizontally extending flange 38 that is secured to the bottom of the beam 32 by a threaded fastener 40, which permits the elevation of the pusher bar 28 to be adjusted relative to the beam 32. Further, adjacent inner ends of the pusher bars 26, 28 are carried in a bracket 42, and can be adjusted along their longitudinal axes by threaded fasteners 44, 46, respectively that are received in slots 48, 50, respectively of flanges 52, 54, respectively. The flanges 52, 54, in turn, are secured to the bracket 42. The adjacent inner ends of the pusher bars 26, 28 are also adjustable in a horizontal plane transversely of their longitudinal axes by adjustably securing the adjacent inner ends of the flanges 52,54 to the bracket 42 by way of threaded fasteners 56, 58, respectively, which are received in slots 60,62, respectively, of the bracket 42.

The pocket bar 22, which is flexible in a horizontal plane along its length to permit it to be accurately positioned relative to the containers C to be transferred thereby, is adjustable along its longitudinal axis relative to the pusher bars 26,28 without requiring adjustment in the positions of the pusher bars 26,28. To that end, the pocket bar 22 is secured to the pusher bars 26,28 by brackets 64, 66, respectively. The bracket 64 is secured to the pocket bar 22 by a threaded fastener 68, which permits the elevation of the pocket bar 22 to be adjusted relative to the pusher bar 26. The bracket 64 is also secured to the pusher bar 26 by threaded fasteners 70, 72, which are received in a slot 74 in the bracket 64 to permit the pocket bar 22 to be adjusted along its length relative to the pusher bar 26. Likewise, the bracket 66 is secured to the pocket bar 22 by a threaded fastener 76, which permits the elevation of the pocket bar 22 to be adjusted relative to the pusher bar 28, and the bracket 66 is secured to the pusher bar 28 by threaded fasteners 78, 80, which are received in a slot 82 in the bracket 66 to permit the pocket bar 22 to be adjusted along its longitudinal axis relative to the pusher bar 28.

The pusher bar 26 can also be pivoted in a horizontal plane relative to the fastener 36 by providing the bracket 34 which a downwardly extending pin 84 that extends through an opening 86 of a horizontally extending flange portion of the pusher bar 26. Likewise, the pusher bar 28 can also be also be pivoted horizontally relative to the fastener 40 by providing the bracket 38 with a downwardly extending pin 90 that extends through an opening 92 of a horizontally extending flange portion 94 of the pusher bar 28.

Figure 8:
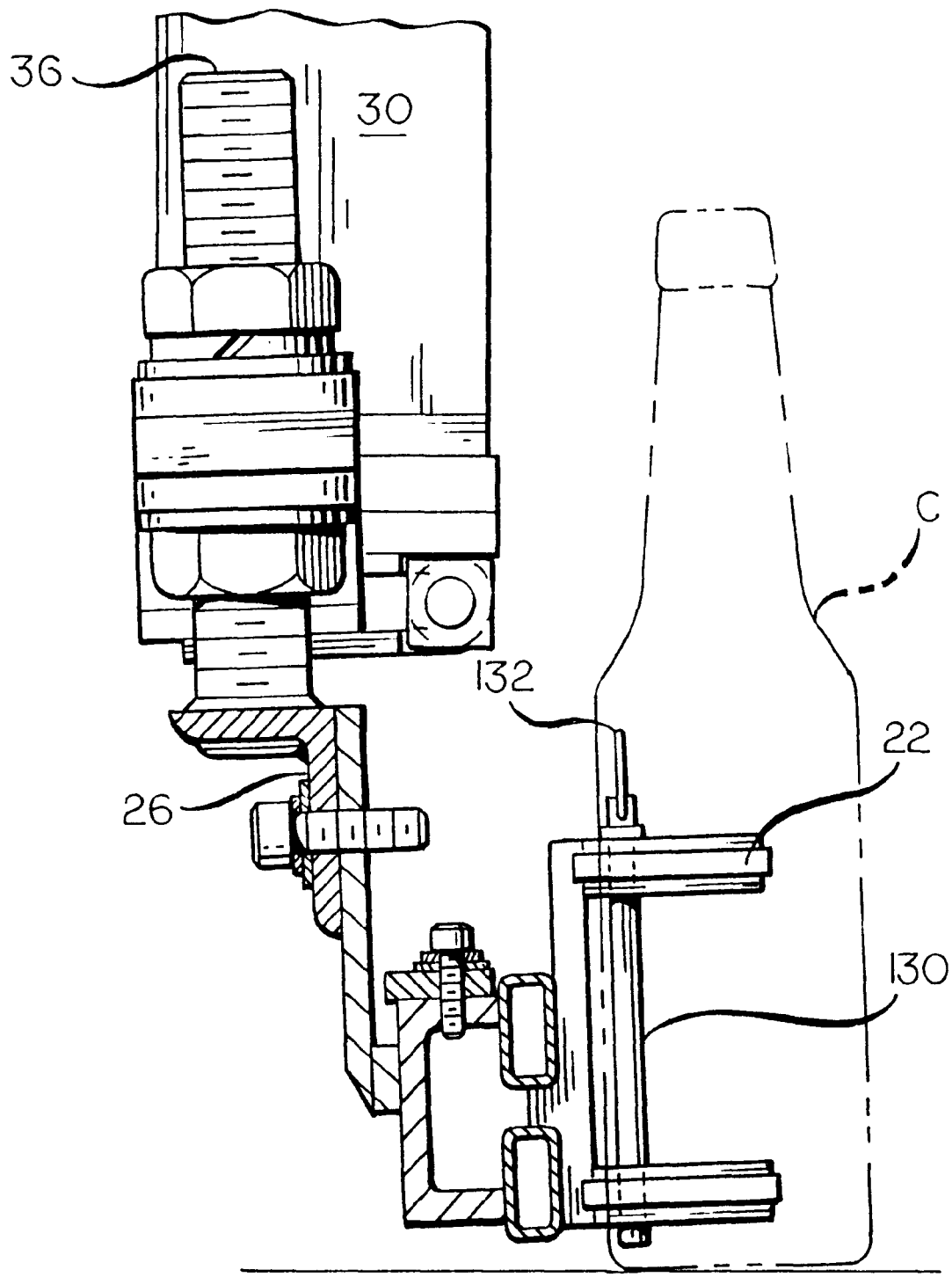
FIG. 8 is a sectional view, at an enlarged scale, taken on line 8—8 of FIG. 1.
Figure 9:
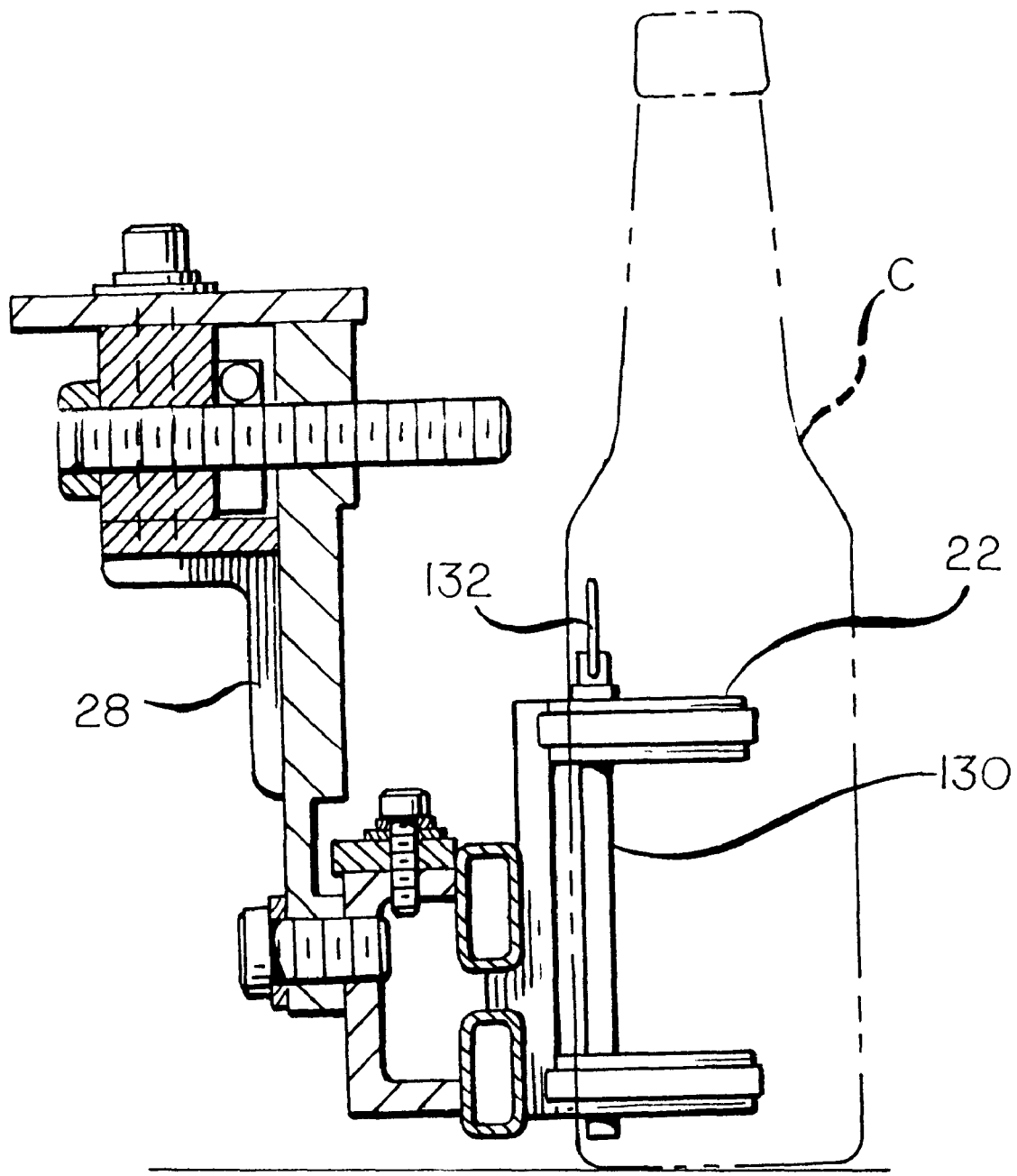
FIG. 9 is a sectional view, at an enlarged scale, taken on line 9—9 of FIG. 1.
Figure 10:
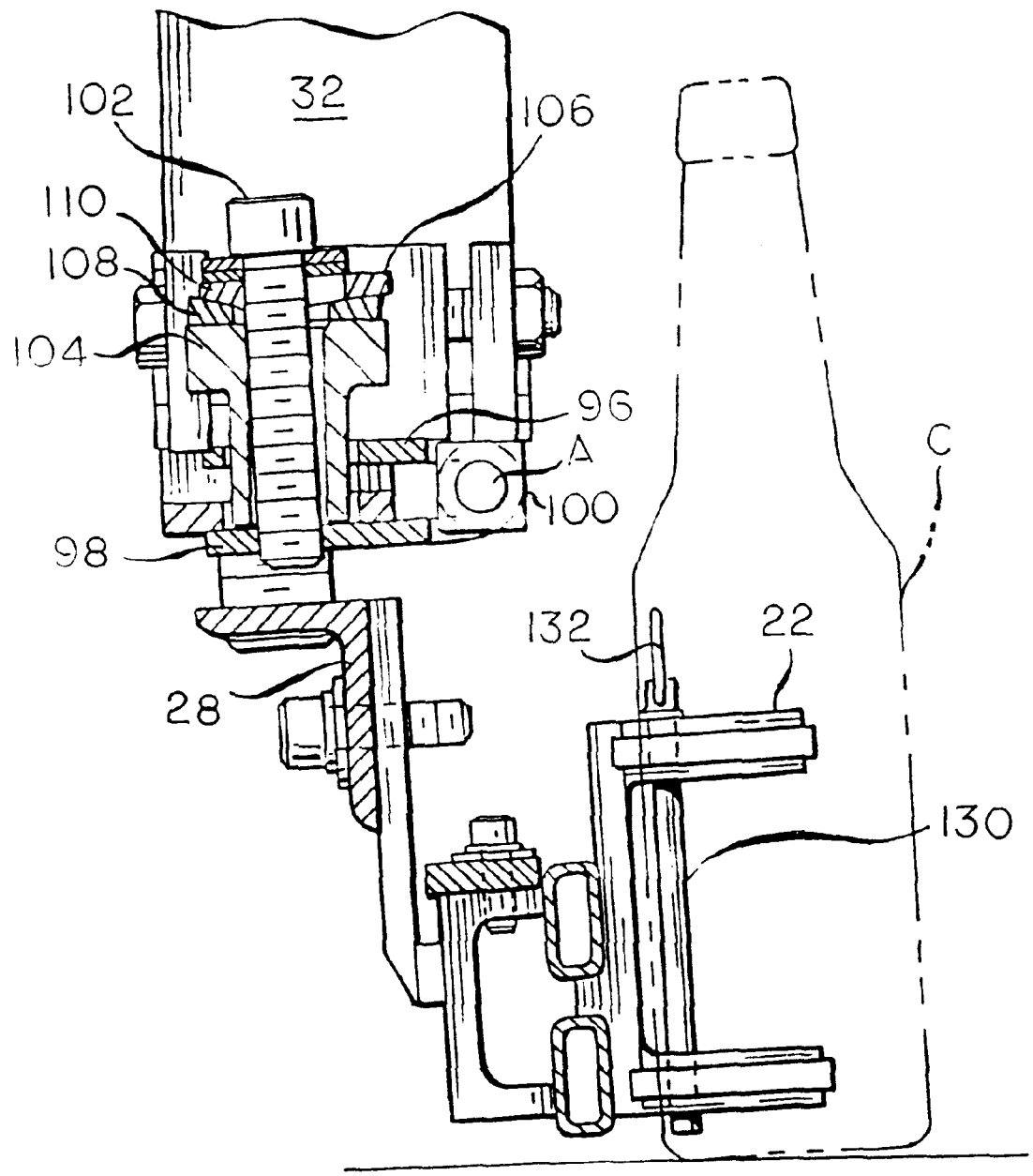
FIG. 10 is a sectional view, at an enlarged scale, taken on line 10—10 of FIG. 1.
Figure 11:
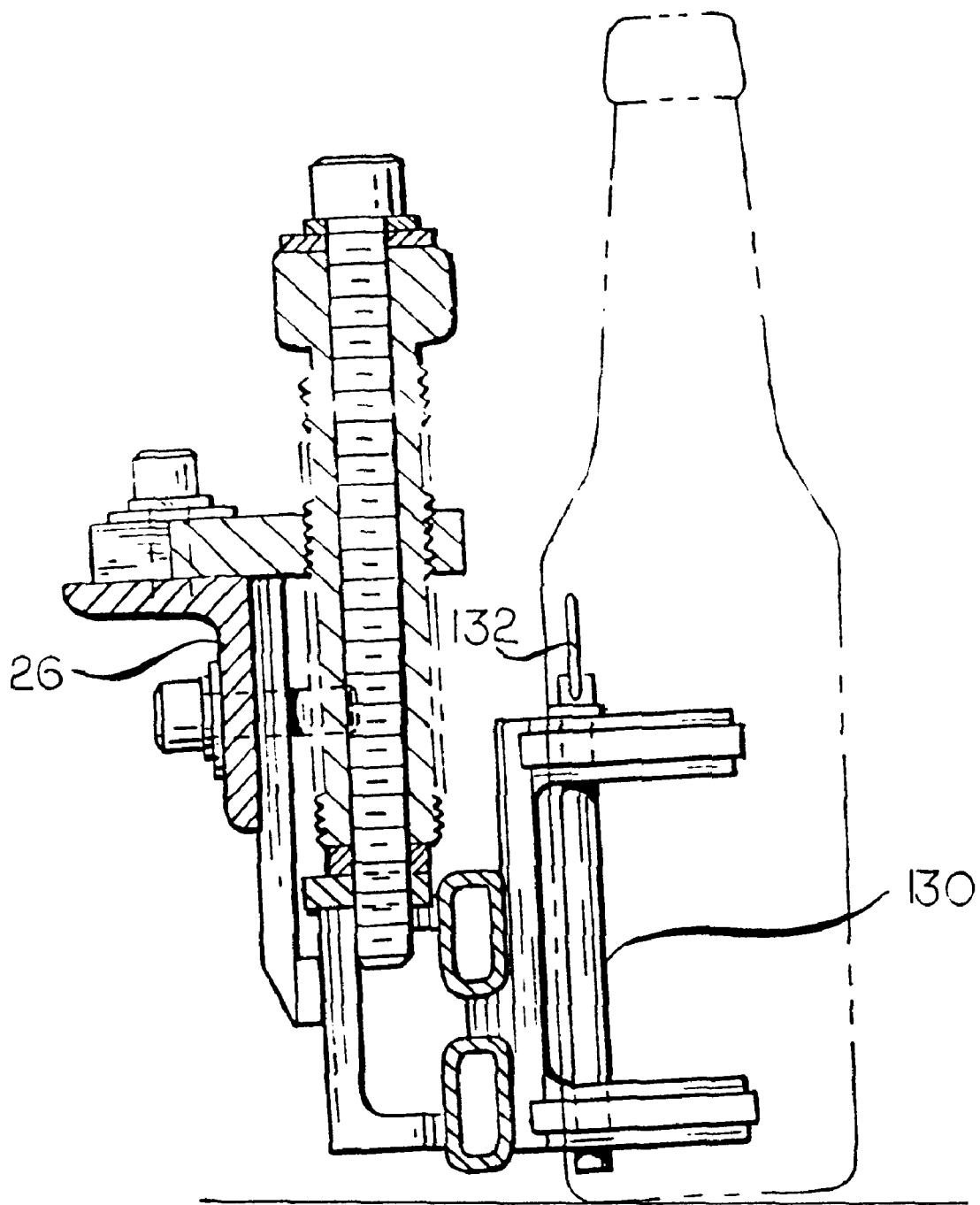
FIG. 11 is a sectional view, at an enlarged scale, taken on line 11—11 of FIG.

As is shown in FIGS. 8 and 10, it is desirable to be able to provide the pocket bar 22 with a slight inclination from a true vertical inclination so that the containers C engaged thereby are pushed along a rearward portion of their bottom surfaces, to thereby retard toppling of the containers C during their transfer. To this end, as is shown particularly in FIG. 10, the pusher bar 28 is adjustable in its orientation relative to the beam 32. This is accomplished by constructing the flange 38 with a spaced apart pair of plates, an upper plate 96 and a lower plate 98. The lower plate 98 is hingedly secured to the upper plate 96 about an axis A, which is the longitudinal central axis of a threaded fastener 100 that is used to secure the upper plate 96 and the lower plate 98 to one another. The lower plate 98 is caused to move arcuately relative to the upper plate 96, which is rigidly secured to the beam 32, by rotation of a threaded cap screw 102. The shank of the cap screw 102 passes through a generally T-shaped annular member 104, which is fixedly positioned relative to the upper plate 96 and has a sufficiently large internal opening to permit the orientation of the cap screw 102 to be varied from a true vertical orientation, as desired. The underside of the head of the cap screw 102 is supported on the annular member 104 by a conical washer assembly 106, which is made up of a lower conical washer 108, with an upwardly facing conical surface, and an upper conical washer 110, with a downwardly facing conical surface.

The lower end of the cap screw 102 is threadably received in the lower plate 98 of the flange 38, so that any change in the orientation of the cap screw 102 will cause the lower plate 98 to move arcuately relative to the upper plate 96 about the axis A. The orientation of the cap screw 102 is changed by sliding motion of the upper conical washer 110 and lower conical washer 108 relative to one another, one of both of such conical washers 108, 110 being provided with a sufficiently large internal diameter to permit it to be moved radially relative to the axis of the cap screw 102.

While not specifically illustrated, the flange 34 is adjustably secured to the beam 30 in the same manner that the flange 38 is secured to the beam 32, as described above, a cap screw 112 being provided to perform the same function as the cap screw 102 in the arrangement illustrated in FIG. 10.

Figure 4:
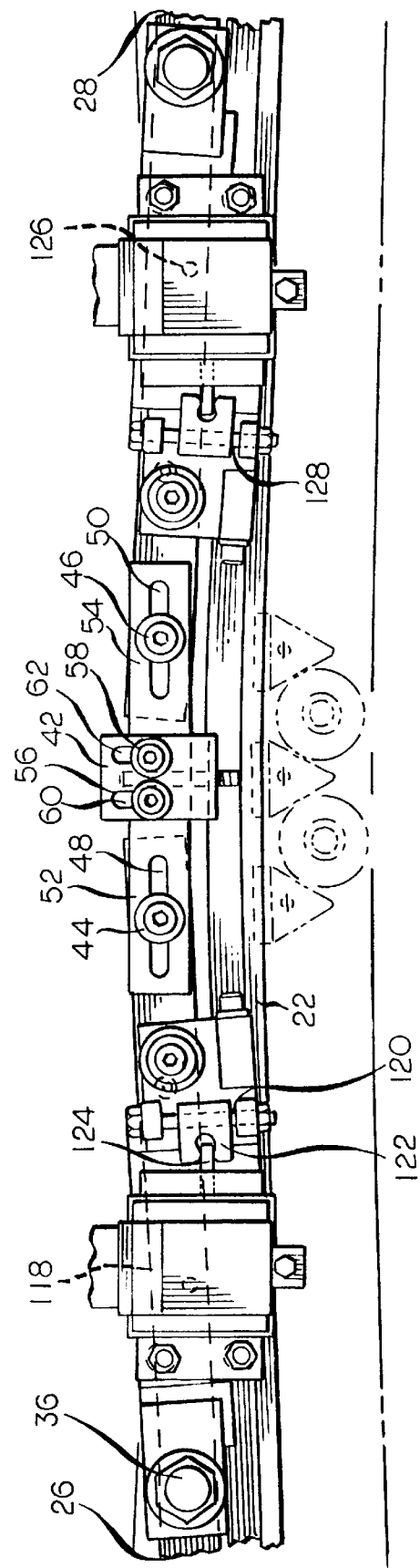
FIG. 4 is a fragmentary plan view, at an enlarged scale, of a pusher bar assembly according to FIGS. 1–3.
Figure 5:
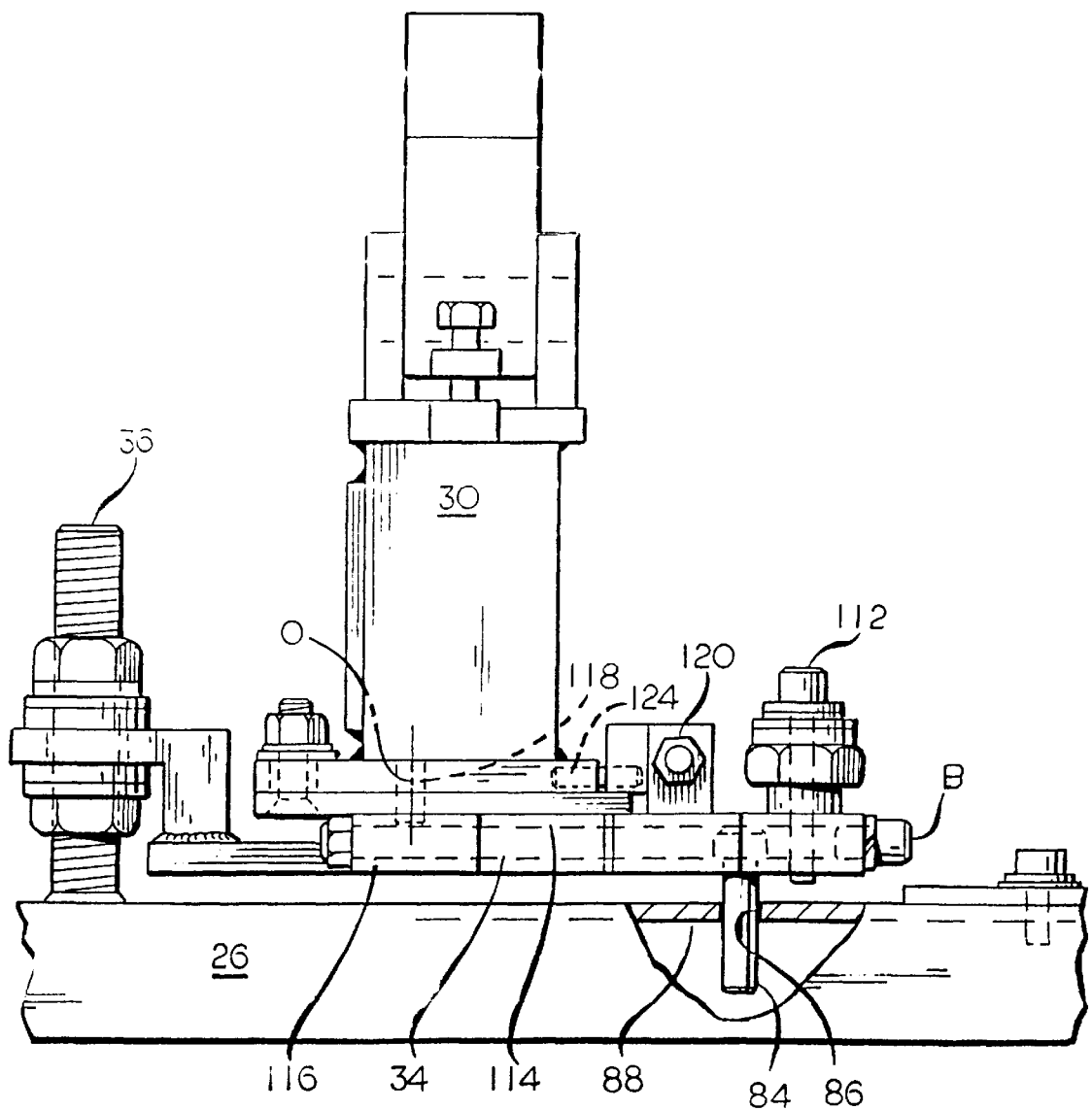
FIG. 5 is a fragmentary elevation view, at a further enlarged scale, of the pusher bar assembly of FIGS. 1–4.
Figure 6:
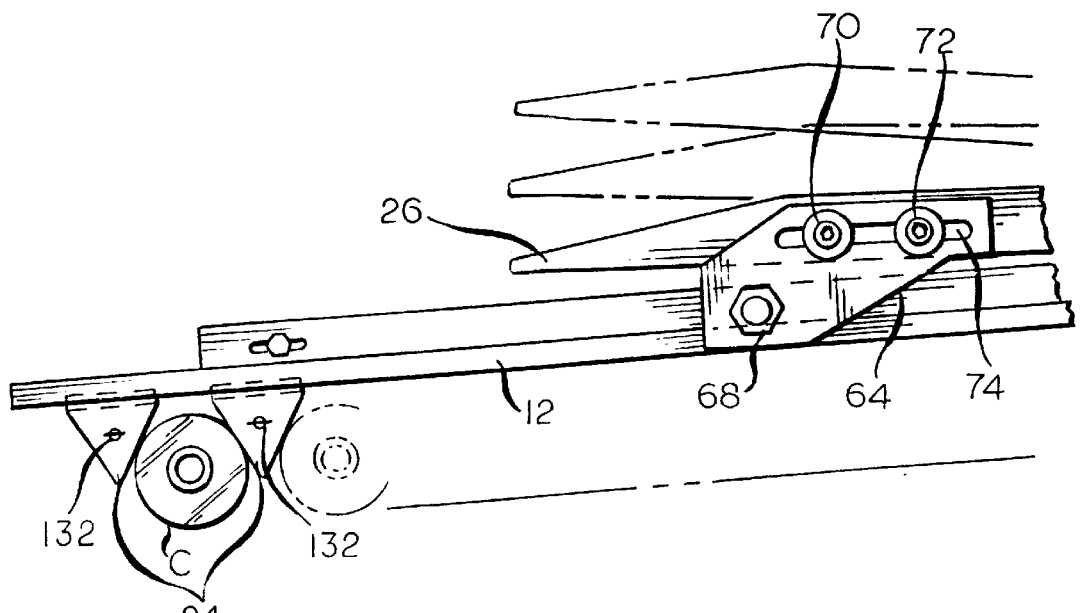
FIG. 6 is a fragmentary plan view, at an enlarged scale, of the pusher bar assembly of FIGS. 1–5.
Figure 7:
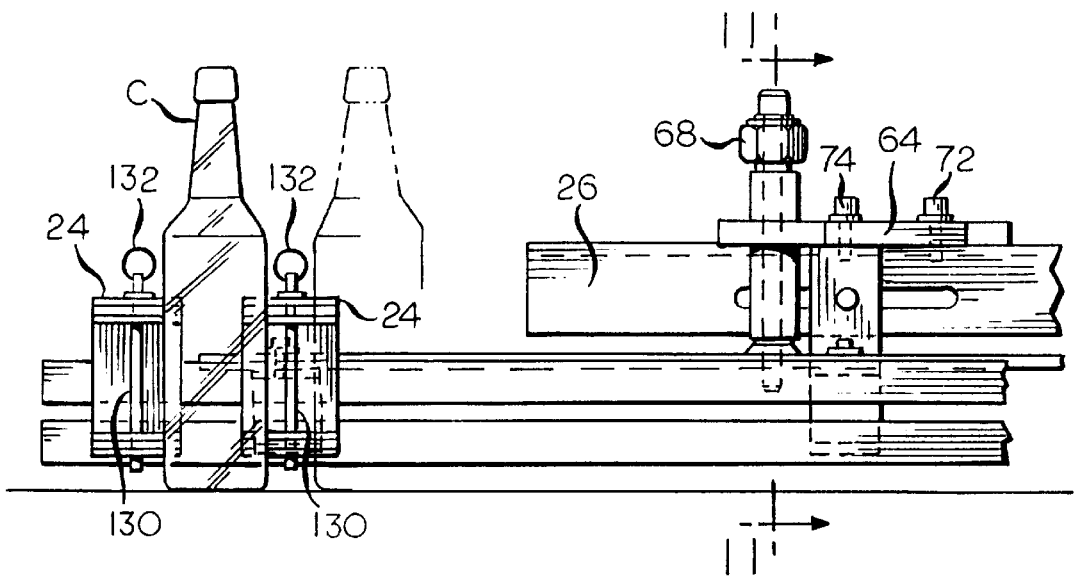
FIG. 7 is a fragmentary elevation view, at an enlarged scale, of a pusher bar assembly according to FIGS. 1–6.

As is illustrated in FIG. 5, the flange 34 is provided with an upper plate 114 and a lower plate 116. The lower plate 116 is pivotable relative to the upper plate 114 along a horizontally extending axis B in the manner that the lower plate 98 of the flange 38 is pivotable relative to the upper plate 96 about the axis A, as described above. The lower plate 116 is also pivotable in a horizontal plane relative to the upper plate 114 about a vertically extending axis D, which extends through a downwardly extending pin 118 to move the orientation of the pusher bar 26 out of alignment with the pusher bar 28, when required to impart a slightly crescent-shaped array to the wave of containers C being advance by the pusher bar assembly 20, as is illustrated in FIG. 2, for example, where different positions of the pusher bar 26 are illustrated in broken line. The pivoting motion of the lower plate 116 about the axis O is manually accuated by a threaded member 120 that is threadably received in a C-shaped follower 122 (FIG. 4). The follower 122 receives a pin 124, which extends outwardly from the upper plate 114, and is caused to move to and fro by the rotation of the threaded member 120.

Likewise, the lower plate 98 of the flange 38 is pivotable in a generally horizontal plane relative to the upper plate 96 about a pin, a threaded member 128 being provided to perform the function of the threaded member 120 of the arrangement for horizontally adjusting the orientation of the lower plate 116 of the flange 34 relative to the upper plate 114, as previously described.

Because it if often desirable to change the spacing of the teeth 24 of the pocket bar 22 relative to one another, for example, when the diameters of the containers C change from time to time, a quick disconnect feature is provided for securing the pocket bar 22 to the pusher bars 26, 28, so that a different pocket bar 22 with differently spaced teeth 24 can be used, as opposed to varying the spacing of the teeth 24 on a given pocket bar 22. To that end, a spaced apart plurality of pins 130, each with a pull ring 132 at its upper free end, is provided to removably secure the teeth 24 to the pusher bars 26, 28 by being inserted through aligned apertures in the teeth 24 and the pusher bars 26, 28, respectively.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalentsthereof.

What is claimed is:

1. A pusher bar assembly for an article transfer device for transferring a plurality of articles disposed in a linear array on an article transfer conveyor transversely of the conveyor, said pusher bar assembly comprising:

a laterally extending pocket bar having pockets, said pocket bar having an extent sufficient to engage all articles to be transferred in unison from an article transfer conveyor transversely of the article transfer conveyor;

first and second pivotable pusher bars disposed end to end longitudinally to each other with adjacent ends of said pusher bars being spaced apart from one another;

means for releasably securing said pocket bar parallel to each of said first and second pusher bars;

first support means for supporting said first pusher bar; and second support beams for supporting said second pusher bar.

2. A pusher bar assembly according to claim 1 wherein said pockets of said pocket bar are defined by a plurality of teeth removably secured to said pocket bar, and further comprising means for releasably securing said teeth to said pocket bar comprising a spaced apart plurality of generally vertically extending pins each of which passes thorough aligned apertures in said pocket bar and one of said teeth, and a pull ring secured to each of said generally vertically extending pins at an upper free end thereof.

3. A pusher bar assembly according to claim 1 wherein said first support means comprises means for adjusting the orientation of said first pusher bar in a vertical plane extending transversely of the linear array; and means for adjusting the orientation of said second pusher bar in a vertical plane extending transversely of the linear array;

whereby a slight tilt can be provided to articles being transferred by said pusher bar assembly to avoid toppling of the articles during transfer.

4. A pusher bar assembly according to claim 1 wherein said pocket bar is flexible along its length, and further comprising;

means for adjusting the orientation of said first pusher bar in a horizontal plane extending generally transversely of said first support means; and means for adjusting the orientation of said second pusher bar in a horizontal plane extending generally transversely of second support means;

whereby a curvature can be imparted to said pocket bar by the adjustment of said means for adjusting said first pusher bar in a horizontal plane and said means for adjusting said second pusher bar in a horizontal plane.

5. A pusher bar assembly according to claim 1 and further comprising;

means for adjusting the elevation of said first pusher bar relative to said first support means; and means for adjusting the elevation of said second pusher bar relative to said second support means.

6. A pusher bar assembly according to claim 1 wherein said means for releasably securing said pocket bar to said first and second pusher bars permits adjustment of the location of said pocket bar along its longitudinal axis relative to the locations of said first and second pusher bars.

7. A pusher bar assembly according to claim 1 wherein said article transfer device is a lehr loader for loading hot, freshly formed glass containers into an annealing lehr.

* * * * *